(12) United States Patent
Colignon

(10) Patent No.: US 7,743,607 B2
(45) Date of Patent: Jun. 29, 2010

(54) SYSTEM FOR ASSISTING REGENERATION OF POLLUTION MANAGEMENT MEANS IN AN ENGINE EXHAUST LINE

(75) Inventor: Christophe Colignon, Levallois Perret (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 687 days.

(21) Appl. No.: 11/571,257

(22) PCT Filed: Jun. 21, 2005

(86) PCT No.: PCT/FR2005/050471

§ 371 (c)(1),
(2), (4) Date: Dec. 22, 2006

(87) PCT Pub. No.: WO2006/005871

PCT Pub. Date: Jan. 19, 2006

(65) Prior Publication Data

US 2008/0016854 A1    Jan. 24, 2008

(30) Foreign Application Priority Data

Jun. 23, 2004    (FR)    .................................. 04 06862

(51) Int. Cl.
*F01N 3/00* (2006.01)
(52) U.S. Cl. ............................ 60/295; 60/284; 60/285; 60/286
(58) Field of Classification Search .................. 60/295, 60/274, 280
See application file for complete search history.

(56) References Cited

U.S. PATENT DOCUMENTS

| 2003/0230079 A1 | 12/2003 | Kuboshima et al. |
| 2004/0083715 A1* | 5/2004 | Le Leux et al. ............... 60/280 |
| 2004/0118110 A1* | 6/2004 | Kondo et al. .................. 60/295 |

FOREIGN PATENT DOCUMENTS

| EP | 1072763 A | 1/2001 |
| FR | 2771449 A | 5/1999 |

* cited by examiner

*Primary Examiner*—Thomas E. Denion
*Assistant Examiner*—Jesse Bogue
(74) *Attorney, Agent, or Firm*—Nicolas E. Seckel

(57) ABSTRACT

The invention concerns a system for assisting regeneration of pollution management means (1) associated with oxidation catalyst forming means (2) implementing an oxygen storage capacity (OSC) function, and integrated in an exhaust line of a motor vehicle diesel engine (4), wherein the engine is associated with common ramp means (7) supplying fuel to the cylinders thereof. The invention is characterized in that it comprises means (8) for determining the frequency of the pollution management means regeneration and for comparing same to predetermined threshold values (10), to control the engine (4) in a first lean mixture regeneration operating mode (11) for frequencies less than the threshold values or in a second regeneration operating mode implementing engine operating sequences alternating rich mixture and lean mixture operating phases (12) for frequencies more than the threshold values.

20 Claims, 2 Drawing Sheets

Figure 1:
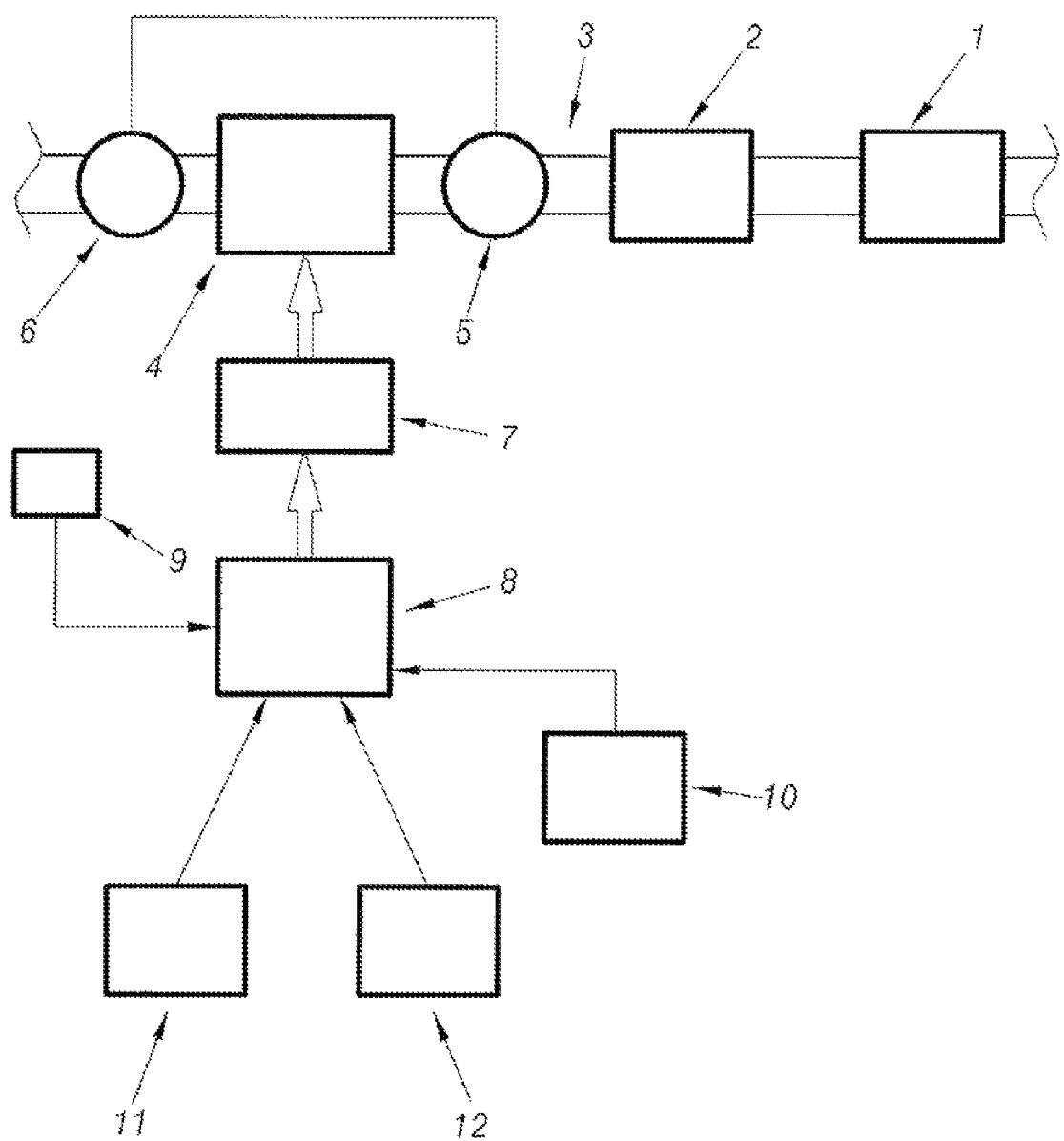

SYSTEM FOR ASSISTING REGENERATION OF POLLUTION MANAGEMENT MEANS IN AN ENGINE EXHAUST LINE

The present invention concerns a system for assisting the regeneration of depollution means associated with means forming oxidation catalyst implementing an OSC function constituting an oxygen reserve, integrated in an exhaust line of a motor vehicle diesel engine.

More particularly, the invention relates to such a system in which the engine is associated with common rail means for the supply of fuel to the cylinders thereof.

To ensure the regeneration of depollution means such as a particle filter, the soot trapped therein is burned thanks to the thermal energy provided by the engine and to the exotherm performed by the conversion of the HC and of the CO on means forming oxidation catalyst placed upstream of the particle filter.

This combustion can be assisted by a catalyst element mixed with the soot, coming, for example, from a regeneration assistance additive, mixed with the fuel for the supply of the engine, or by a catalyst deposited directly on the walls of the particle filter (catalyzed particle filter).

The higher the thermal levels in the exhaust line at the inlet of the particle filter, the shorter the duration of the filter regeneration.

However, in critical driving conditions, such as, for example, city driving or in traffic jams, the thermal levels reached through the standard strategies for assisting the regeneration of the particle filter can prove insufficient to ensure the correct regeneration of the filter, which can translate into regenerations that last very long and are thus highly fuel-consuming, or even incomplete.

Any strategy of elevating the thermal levels during these critical driving conditions makes it then possible to ensure complete regenerations, to reduce the over-consumption caused by this regeneration of the particle filter, and above all to increase the security margin with respect to the cracking or the breakage of this filter.

The objective of the invention is to propose such a strategy.

To this effect, an object of the invention is a system for assisting the regeneration of depollution means associated with means forming oxidation catalyst implementing an OSC function, constituting an oxygen reserve and integrated in an exhaust line of a motor vehicle diesel engine, in which the engine is associated with common rail means for the supply of fuel to the cylinders thereof, characterized in that it comprises means for determining the regeneration frequency of the depollution means and for comparing this frequency to predetermined threshold values, to drive the engine in a first operation mode with lean mixture for the frequencies lower than the threshold values or in a second operation mode implementing sequences of operation of the engine alternating operation phases with rich mixture and with lean mixture for the frequencies higher than the threshold values.

According to other characteristics:
the depollution means comprise a particle filter;
the particle filter is catalyzed;
the depollution means comprise a NOx trap;
the fuel comprises an additive intended to be deposited, with the particles with which it is mixed, on the depollution means to facilitate their regeneration;
the fuel comprises an additive forming NOx trap;
the depollution means are impregnated with an SCR formulation, ensuring a CO/HC oxidation function;
the engine is associated with a turbo-compressor; and
the regeneration frequency of the depollution means is determined from the five last regeneration attempts thereof.

Figure 2:
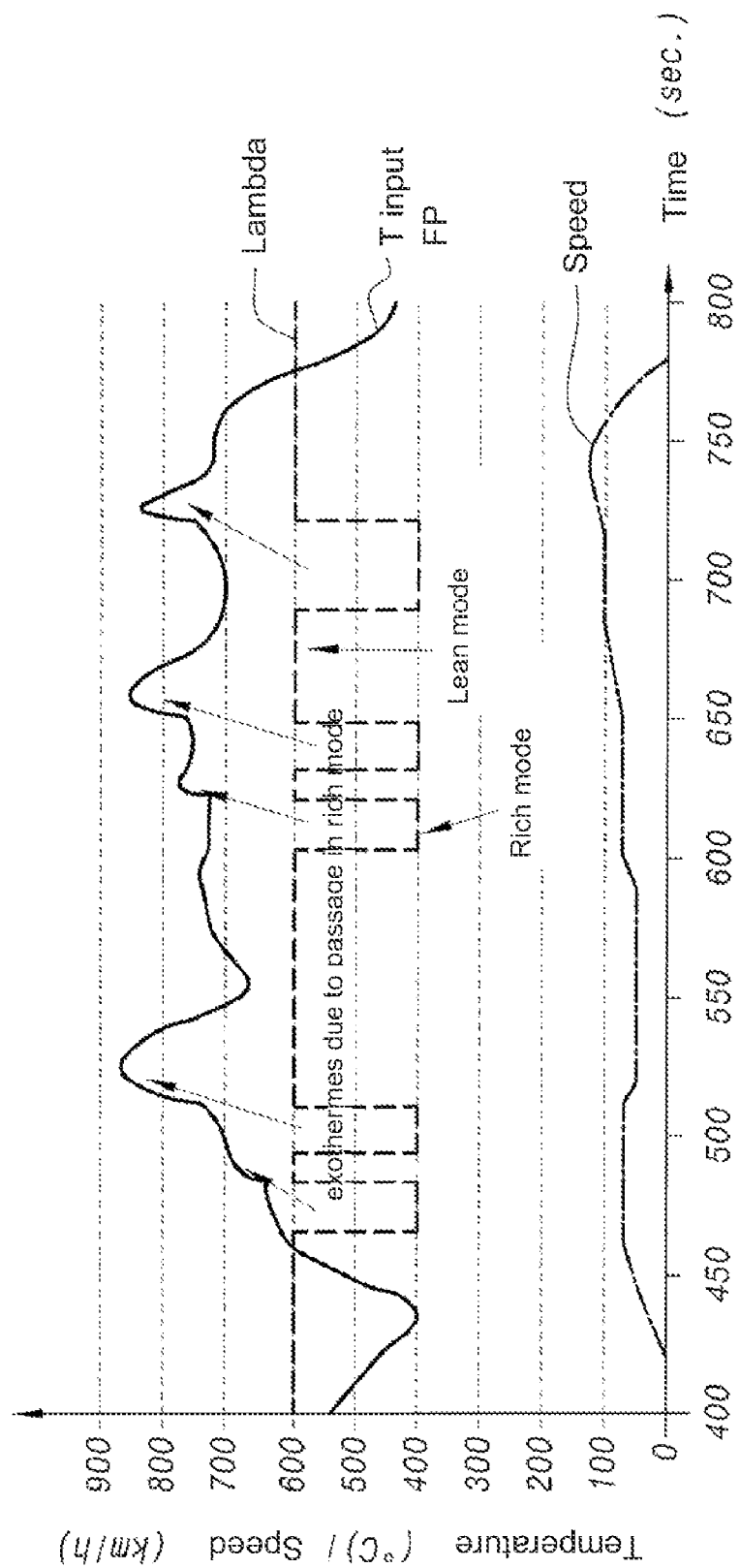

The invention will be better understood by reading the following description, given by way of example only and made in reference to the annexed drawings, in which:

FIG. 1 is a synoptic schematic view illustrating the structure of an assistance system according to the invention; and FIG. 2 illustrates the operation thereof.

Indeed, FIG. 1 shows a system for assisting the regeneration of depollution means designated by the general reference 1, associated with means forming oxidation catalyst, implementing an OSC function constituting an oxygen reserve, designated by the general reference 2, and placed in an exhaust line 3 of a motor vehicle engine.

The engine is designated by the general reference 4 and can be associated, for example, with a turbo-compressor whose turbine portion 5 is associated with the exhaust line and whose compressor portion 6 is placed upstream of the engine.

Such means forming oxidation catalyst implementing an OSC function are already known in the state of the art.

The engine is associated with common rail means for the supply of fuel to the cylinders thereof designated by the general reference 7, whose operation is controlled by a supervisor 8.

According to the invention, this system also comprises means for determining the regeneration frequency of the depollution means and means for comparing this frequency with predetermined threshold values to control the operation of the engine.

These means formed, for example, by the supervisor 8, are then connected to means for determining this frequency, designated by the general reference 9, providing this frequency to the supervisor 8, so as to enable this supervisor to compare it to threshold values such as provided by generation means 10 comprising any appropriate means making it possible to establish these threshold values.

The determination of the regeneration frequency of the depollution means is indeed important.

This frequency is determined from the average distance traveled, for example, between the five last regenerations, by calculation taking into account the five last attempts at regeneration or activation of the request for regeneration assistance which has resulted in a regeneration balance.

This calculation is based on the mileage at the beginning of the requests for regeneration assistance.

To avoid too frequent regenerations, the mileage between each regeneration for the five regenerations is thus recorded, for example, in a memory of the E-EPROM type.

From these five values, it is thus possible to calculate a mileage average of regeneration to determine this regeneration frequency.

Of course, other embodiments can be envisioned.

This number thus determined is subsequently compared to threshold values to determine the optimal strategy to be applied.

As a function of the result of this comparison, the supervisor and the common rail means for the supply of fuel are adapted to drive the engine in a first operation mode of regeneration with lean mixture for the frequencies lower than the threshold values (average distance between regenerations higher than a threshold value), or in a second operation mode of regeneration implementing sequences of operation of the engine alternating operation phases with rich mixture and with lean mixture, for the frequencies higher than the threshold values (average distance between regenerations lower than a threshold value). These operation phases with rich or lean mixture are established in a standard manner by modifying the parameters for controlling the operation of the engine.

These strategies are designated by the general references 11 and 12, respectively, on this Figure.

This is illustrated on FIG. 2, on which the exotherms connected to the passage to the rich operation mode of the engine is clearly visible.

In rich mode, the diesel engine emits a large amount of CO and unburned hydrocarbons in the exhaust gases.

Further, the amount of oxygen present in the gases is highly reduced (lower than 2-3% and sometimes to less than 1%). The passage of these gases in the means forming oxidation catalyst enables the combustion of the CO and of the HC by the oxygen present in the gases.

In order to be able to convert a larger amount of CO and of the HC, it is desirable to make available a larger amount of oxygen.

To this effect, the presence of the component of the OSC type constituting an oxygen reserve (Oxygen Storage Capacity), such as, for example, cerium, which stores oxygen in the form of cerium oxide —$CeO_2$— or a mixed oxide of cerium and zirconium in the means forming oxidation catalyst, makes it possible to release oxygen during the passages of the engine in rich mode.

The combustion of the CO and of the HC is an exothermic reaction and makes it possible to increase the thermal levels at the outlet of the means forming oxidation catalyst, i.e., in fact, the inlet of the particle filter.

In lean operation mode of the engine (mode RG PF), there are much less reducers (CO, HC) than in rich operation mode, but despite a lower oxygen content, compensated in part by the presence of the OSC component, the exotherm produced by the means forming oxidation catalyst is more important in rich mode than in lean regeneration mode of the particle filter.

The passage in rich operation mode makes it thus possible to heat the exhaust gases more, which accelerates the speed of regeneration of the particle filter.

In the case of a particle filter using a regeneration assistance additive, the increase of the thermal levels makes it possible to reduce the dosage of the additive and thus to increase the distance covered by the vehicle before cleanup of the filter.

Indeed, it is known that such an additive can be mixed with the fuel for the supply of the engine to be deposited on the particle filter with the particles with which it is mixed, in order to lower the combustion temperature of the soot trapped therein.

In a standard manner, this additive is indeed present in the particles after combustion of the additivized fuel in the engine.

Of course, different embodiments can be envisioned.

Thus, for example, the depollution means can comprise a particle filter, catalyzed or not, a NOx trap, etc.

These depollution means can also be impregnated with an SCR formulation ensuring a CO/HC oxidation function in a standard manner.

Further, the depollution means and the means forming oxidation catalyst can be integrated into a single and same element, in particular on the same substrate.

By way of example, a particle filter integrating the oxidation function can be envisioned.

Similarly, a NOx trap integrating such an oxidation function can also be envisioned, whether it is additivized or not.

This oxidation and/or NOx trap function can be fulfilled, for example, by an additive mixed with the fuel.

It is thus understood, as illustrated in FIG. 2, that the driving of the engine makes it possible to increase the thermal levels, as compared to a standard operation, in particular for critical loading states, which thus enables a faster and more complete regeneration of the filter.

The invention claimed is:

1. System for assisting the regeneration of depollution means associated with means forming oxidation catalyst implementing an OSC function, constituting an oxygen reserve and integrated in an exhaust line of a motor vehicle diesel engine, in which the engine is associated with these common rail means for the supply of fuel to the cylinders thereof, wherein said system comprises:

means for determining the frequency of attempts at regeneration and activations of requests for regeneration of the depollution means and for comparing this frequency to predetermined threshold values, wherein the engine is driven in (i) a first regeneration operation mode with lean mixture for the frequencies lower than the threshold values and in (ii) a second regeneration operation mode implementing sequences of operation of the engine alternating operation phases with rich mixture and with lean mixture for the frequencies higher than the threshold values.

2. System according to claim 1, wherein the depollution means comprise a particle filter.

3. System according to claim 2, wherein the particle filter is catalyzed.

4. System according to claim 1, wherein the depollution means comprise a NOx trap.

5. System according to claim 1, wherein the fuel comprises an additive intended to be deposited, with the particles with which it is mixed, on the depollution means to facilitate their regeneration.

6. System according to claim 1, wherein the fuel comprises an additive forming NOx trap.

7. System according to claim 1, wherein the depollution means are impregnated with an SCR formulation, ensuring a CO/HC oxidation function.

8. System according to claim 1, wherein the engine is associated with a turbo-compressor.

9. System according to claim 1, wherein the regeneration frequency of the depollution means is determined from the five last regeneration attempts thereof.

10. System according to claim 1, wherein the regeneration frequency is calculated based on an average distance traveled by the vehicle between two regenerations.

11. Method for assisting the regeneration of depollution means associated with means forming oxidation catalyst implementing an OSC function, constituting an oxygen reserve and integrated in an exhaust line of a motor vehicle diesel engine, in which the engine is associated with these common rail means for the supply of fuel to the cylinders thereof, said method further comprising:

determining the frequency of attempts at regeneration and activations of requests for regeneration of the depollution means, comparing this frequency to predetermined threshold values, and driving the engine in (i) a first regeneration operation mode with lean mixture for the frequencies lower than the threshold values and in (ii) a second regeneration operation mode implementing sequences of operation of the engine alternating operation phases with rich mixture and with lean mixture for the frequencies higher than the threshold values.

12. Method according to claim 11, wherein the depollution means comprise a particle filter.

13. Method according to claim 12, wherein the particle filter is catalyzed.

14. Method according to claim 11, wherein the depollution means comprise a NOx trap.

15. Method according to claim 11, wherein the fuel comprises an additive intended to be deposited, with the particles with which it is mixed, on the depollution means to facilitate their regeneration.

16. Method according to claim 11, wherein the fuel comprises an additive forming NOx trap.

17. Method according to claim 11, wherein the depollution means are impregnated with an SCR formulation, ensuring a CO/HC oxidation function.

18. Method according to claim 11, wherein the engine is associated with a turbo-compressor.

19. Method according to claim 11, wherein the regeneration frequency of the depollution means is determined from the five last regeneration attempts thereof.

20. Method according to claim 11, wherein the regeneration frequency is calculated based on an average distance traveled by the vehicle between two regenerations.

* * * * *